B. F. McCOY.

METALLIC SHOE COUNTER.

APPLICATION FILED JULY 14, 1913.

Reissued May 4, 1915.

13,912.

Witnesses:
Edgar T. Farmer
Amos M. Holcombe

Inventor:
Benjamin F. McCoy
By Connett & Connett his attys.

UNITED STATES PATENT OFFICE.

BENJAMIN F. McCOY, OF ST. LOUIS, MISSOURI.

METALLIC SHOE-COUNTER.

13,912. Specification of Reissued Letters Patent. Reissued May 4, 1915.

Original No. 1,064,923, dated June 17, 1913, Serial No. 717,112. Application for reissue filed July 14, 1913. Serial No. 779,059.

*To all whom it may concern:*

Be it known that I, BENJAMIN F. McCOY, a citizen of the United States, and a resident of the city of St. Louis and State of Missouri, have invented certain new and useful Improvements in Metallic Shoe-Counters, of which the following is a specification containing a full, clear, and exact description, reference being had to the accompanying drawings, forming a part hereof.

My invention relates to an improved metallic shoe counter, and consists in the novel construction hereinafter described and pointed out in the claims appended hereto.

The object of my invention is to provide an improved metallic shoe counter which shall be very cheap to manufacture and to place in the shoe, and which can be lasted to the shoe in a highly efficient manner.

Metallic shoe counters as heretofore made must be pre-formed exactly to fit the shoe, and are not suitable for lasting by machine. A metallic shoe counter made in accordance with this invention has sufficient flexibility combined with the necessary rigidity to enable it to be fitted to the shoe on the last and lasted by machine.

Figure 1:
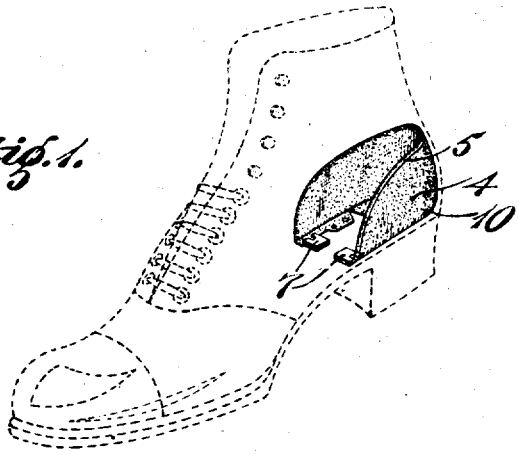
Figure 2:
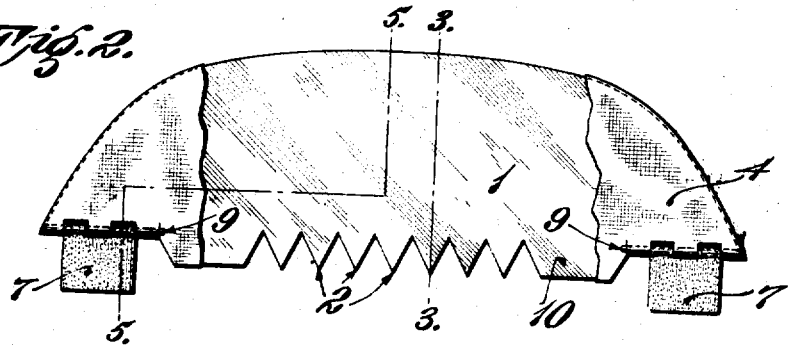
Figure 3:
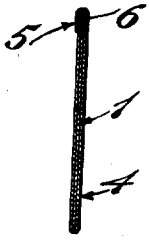
Figure 4:
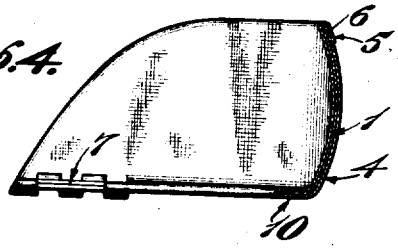
Figure 5:
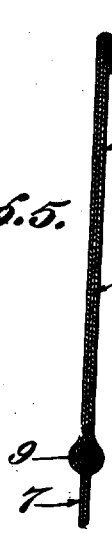
Figure 6:
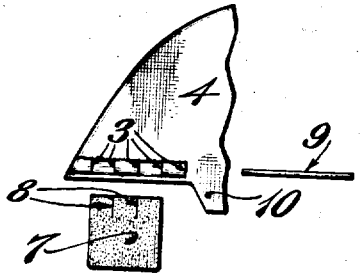

In the drawings,—Figure 1 is a perspective view of my improved shoe counter applied to a shoe, the shoe being represented by dotted lines; Fig. 2 is a plan view of the metallic counter blank covered with fabric and ready for the former; Fig. 3 is a section taken on the line 3—3 of Fig. 2; Fig. 4 is a sectional side elevation of my improved shoe counter following the preliminary forming operation; Fig. 5 is an enlarged detail cross section taken on the line 5—5 of Fig. 2; and Fig. 6 is a detailed side elevation of the front end of one wing, illustrating the manner of applying the fabric or leather sewing or stitching flaps.

The numeral 1 indicates the metallic body of the counter, which may be composed of any suitable sheet metal having the proper stiffness, and the same is stamped from a sheet by means of suitable dies, and provided with a series of integral V-shaped projections 2 at the lower edge of the blank, the upper edge of the blank being rounded or tapered downwardly to its ends in order to give the counter the desired shape after the same has been run through a suitable counter forming machine. The V-shaped projections 2 extend a considerable distance beyond the adjacent edge of the blank, and the line on which the inner extremities thereof join the edge of the blank becomes by the forming operation approximately the line of bend between the vertical portion of the counter and the inturned nailing and sewing flange. The metal near the points of the V-shaped projections may be thinned in case it is too thick for the tacks used in lasting to penetrate it readily. Thinning the V-shaped points is unnecessary except for counters which are made of comparatively heavy metal.

The numeral 3 indicates a series of vertical slits formed in the lower edge of the blank near its ends, the purpose of which will be explained later on.

After the blank has been stamped into the form in which it is shown in Fig. 2, the same is provided with a suitable covering 4 of fabric, which is preferably secured in position by means of paste or other adhesive, said fabric being doubled over the lower edge of the blank and folded over the upper edge of the same, as shown in Figs. 4 and 5, to form a reinforcement 5 upon the outer surface near the upper edge. I also prefer to double upon itself the metal near the upper edge of the blank to form a metallic reinforcement 6 upon the outer surface of the blank near the upper edge thereof.

I will now describe one means for securing the wing flaps to the blank. It is evident that other means for securing the wing flaps may be used, or the wing flaps may be dispensed with, without rendering the counter unfit for use in a shoe lasting machine.

The numeral 7 indicates the wing flaps, which may be composed of leather or any suitable fabric. In case they are made of fabric, the fabric is first doubled upon itself as shown in Fig. 5, and then a series of vertical slits 8 is formed in the upper edge of the double portion to correspond to the position of the slits 3 in the wings of the blank; then the metal and fabric located between the adjacent slits 3 is alternately bent outwardly and inwardly to receive a securing pin or wire 9; and then the corresponding slitted portions of the upper edge of said flaps 7 are placed alternately in the spaces between said slits 3 of the fabric covered metal blank and then said wire or pin 9 is inserted in the passages formed between said slits 3 and in the space between the slitted layers of said flaps. Finally, the joint between the slitted portions of the wings of the flaps is flattened and the lower edge of the covered blanks, including the V-shaped projections 2, is bent inwardly to form a nailing or sewing flange 10, whereby the counter may be secured in position within the shoe. The preliminary shaping of the counter to approximate form may be carried out in a counter forming machine at the same time that the nailing and sewing flange is bent along its lower edge. The counter blank thus approximately shaped is inserted in the shoe upper and fitted to the last in a lasting machine, the lasting operation giving the counter the desired form to fit the shoe. My counter being adapted for fitting to the last obviates the necessity for making the counter blanks lefts and rights, and also enables a few sizes of counter blanks to be used for an entire run of shoes of assorted sizes.

Suitable nails may be driven through the V-shaped projections 2 and through the flange 10, and also through the flap 7, if used, for securing the counter in position; or the inturned portion of the counter, with or without the flap, may be stitched to the underlying portion of the shoe. In either case, the operation may be performed entirely on machines ordinarily used in shoe factories. Moreover, the finishing of the shoe by standard welting, sewing and nailing machines in the usual manner is not interfered with by a metallic counter made in accordance with this invention. The counter, when lasted and nailed in place, becomes a rigid part of the shoe not likely to get out of shape.

What I claim is:

1. A metallic shoe counter comprising a flexible heel portion arranged to be bent and fitted to lasts of different heel contours, said heel portion having a series of inturned teeth along its lower edge constituting a discontinuous flange, the arrangement and relative spacing of the teeth being such that the counter may be machine-lasted in a shoe.

2. A metallic counter comprising a flexible heel portion arranged to be bent and fitted to lasts of different heel contours, said heel portion having an inturned serrated flange along its lower edge, the teeth of said inturned flange being pointed and spaced close together, and the notches between the teeth extending into the wall of said heel, whereby said counter may be machine-lasted in a shoe.

3. A metallic shoe counter consisting of flexible side walls and a flexible heel portion arranged to be bent and fitted to lasts of different contours, said counter being provided along its lower edge with narrow inturned projections spaced around the heel portion, the arrangement and relative spacing of the teeth being such that the counter may be machine-lasted in a shoe, the side walls of said counter being provided adjacent to their ends with inturned stitching flaps or extensions which are perforable by a sewing machine needle.

BENJAMIN F. McCOY.

Witnesses:
AMASA M. HOLCOMBE,
M. A. SHELTON.